(12) United States Patent
Tokunaga et al.

(10) Patent No.: US 7,724,060 B2
(45) Date of Patent: *May 25, 2010

(54) INTERFACE CIRCUIT AND A CLOCK OUTPUT METHOD THEREFOR

(75) Inventors: Tetsuya Tokunaga, Gunma-ken (JP); Hiroyuki Arai, Gunma-ken (JP); Shuji Motegi, Tochigi-ken (JP); Takeshi Hibino, Gunma-ken (JP); Takeshi Kimura, Tochigi-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/736,913

(22) Filed: Apr. 18, 2007

(65) Prior Publication Data
US 2007/0241797 A1    Oct. 18, 2007

Related U.S. Application Data

(63) Continuation of application No. 10/943,141, filed on Sep. 17, 2004, now Pat. No. 7,221,198.

(30) Foreign Application Priority Data

Sep. 19, 2003  (JP)  ............................. 2003-328898

(51) Int. Cl.
  *G05F 1/04*  (2006.01)
  *H03K 3/00*  (2006.01)
(52) U.S. Cl. ..................................... 327/299
(58) Field of Classification Search ................. 327/291, 327/292, 298, 299
  See application file for complete search history.

(56) References Cited

U.S. PATENT DOCUMENTS 5,644,549 A * 7/1997 Ju ............................... 365/235
5,808,486 A * 9/1998 Smiley ......................... 327/34
5,938,746 A   8/1999 Ozawa et al.

(Continued)

FOREIGN PATENT DOCUMENTS

EP       0 420 579 A2    4/1991

(Continued)

OTHER PUBLICATIONS

Japanese Office Action dated Jun. 13, 2006, 3 pages.

(Continued)

*Primary Examiner*—Quan Tra
(74) *Attorney, Agent, or Firm*—Fish & Richardson P.C.

(57) ABSTRACT

An interface circuit outputting a clock signal and data to a data register configured to serially read in the data synchronously with the clock signal, in response to a change of a control signal for outputting the clock signal and the data from one logic level to the other logic level, the interface circuit comprising a clock output circuit configured to: detect a logic level of the clock signal when the control signal changes from the one logic level to the other logic level; output the clock signal on an as-is basis to the data register, when detecting one logic level of the clock signal; and output the clock signal after having changed from the other logic level to the one logic level, to the data register, when detecting the other logic level of the clock signal.

25 Claims, 11 Drawing Sheets

U.S. PATENT DOCUMENTS

| | | | |
|---|---|---|---|
| 6,215,817 B1 | 4/2001 | Kimura | |
| 6,263,451 B1 * | 7/2001 | Cheng | 713/600 |
| 2001/0043086 A1 * | 11/2001 | Idei et al. | 327/12 |
| 2002/0188911 A1 * | 12/2002 | Asai | 716/1 |
| 2003/0011558 A1 | 1/2003 | Motegi et al. | |
| 2003/0042956 A1 | 3/2003 | Araki | |
| 2003/0081707 A1 | 5/2003 | Takeuchi et al. | |

FOREIGN PATENT DOCUMENTS

| | | |
|---|---|---|
| EP | 0 793 181 A1 | 9/1997 |
| EP | 0 589 499 B1 | 4/1999 |
| EP | 1 014 333 A1 | 6/2000 |
| EP | 0 793 181 B1 | 6/2005 |
| JP | 61-072439 | 4/1986 |
| JP | 61-218246 | 9/1986 |
| JP | 03-122895 | 5/1991 |
| JP | 4-336724 | 11/1992 |
| JP | 5-113952 | 5/1993 |
| JP | 6-37848 | 2/1994 |
| JP | 06-037848 | 2/1994 |
| JP | 7-288516 | 10/1995 |
| JP | 10-135994 | 5/1998 |
| JP | 2000-138724 | 5/2000 |
| JP | 2000-182399 | 6/2000 |
| WO | WO 96/41417 | 12/1996 |

OTHER PUBLICATIONS

Japanese Office Action mailed Sep. 5, 2006 issued in Application No. 2003-328898 (English Translation included).

European Search Report mailed Aug. 21, 2006 issued in Application No. 04255663.9-2224.

European Patent Office Examination Report dated Mar. 26, 2007.

Summons to attend oral proceedings pursuant to Rule 71(1) EPC from the European Patent Office dated Sep. 7, 2007.

Notification of Reasons for Rejection, Japan Application No. 2006-294326, mailed Sep. 15, 2009 (with English translation), 4 total pages.

Notification of Reasons for Rejection, Japan Application No. 2006-294327, mailed Sep. 29, 2009 (with English translation), 4 total pages.

* cited by examiner

INTERFACE CIRCUIT AND A CLOCK OUTPUT METHOD THEREFOR

CROSS-REFERENCE TO RELATED APPLICATIONS

This is a continuation of application Ser. No. 10/943,141 filed on Sep. 17, 2004, now U.S. Pat. No. 7,221,198, which claims priority upon Japanese Patent Application No. 2003-328898 filed on Sep. 19, 2003, both of which are herein incorporated by reference.

BACKGROUND OF THE INVENTION

1. Field of the invention

The present invention relates to an interface circuit and a clock output method for the interface circuit.

2. Description of the Related Art

Apparatus sets such as car audio and home audio have a plurality of data processing circuits for data processing associated with audio incorporated therein. These data processing circuits are connected in parallel via a controller such as a microcomputer and buses as needed, and by the controller supplying data, each of them executes data processing synchronously with data processing being executed by the other data processing circuits.

With reference to FIG. 9, a data processing system comprising a plurality of data processing circuits and a controller will be described. FIG. 9 is a block diagram for explaining a data processing system comprising a plurality of data processing circuits and a controller. The plurality of data processing circuits include, but not limited to, a PLL (Phase Locked Loop), an LCD (Liquid Crystal Display) driver, a DSP (Digital Signal Processor), an FM multiple receive circuit.

The PLL 4, LCD driver 6, DSP 8, and FM multiple receive circuit 10 are connected to the controller 2 via a data bus DB1 for transmitting a control signal CE, a data bus DB2 for transmitting a clock signal CL (or clock CL), a data bus DB3 for transmitting data DI, and a data bus DB3 for transmitting data D0 as needed.

The controller 2 outputs control signal CL, clock CL, and data DI to the PLL 4, LCD driver 6, DSP 8, and FM multiple receive circuit 10. Also, the controller 2 has data D0 from the PLL 4, LCD driver 6, DSP 8, or FM multiple receive circuit 10 inputted therein while outputting control signal CE and clock CL. The PLL 4, LCD driver 6, DSP 8, or FM multiple receive circuit 10 may not be connected to the controller 2 via data bus DB4. In this embodiment, for example, the controller 2 and the LCD driver 6 are not connected via data bus DB4.

The PLL 4 is for executing tuning of an electronic tuner, and has an interface circuit 4A that performs data input/output with the controller 2 and a data register 4B that holds data output from the interface circuit 4A. The LCD driver 6 is for executing frequency display processing for the electronic tuner, and has an interface circuit 6A that receives data input from the controller 2 and a data register 6B that holds data output from the interface circuit 6A. The DSP 8 is for executing digital processing on audio data, for example, and has an interface circuit 8A that performs data input/output with the controller 2 and a data register 8B that holds data output from the interface circuit 8A. The FM multiple receive circuit 10 is for decoding, FM-multiple, multiple, superposed data, and has an interface circuit 10A that performs data input/output with the controller 2 and a data register 10B that holds data output from the interface circuit 10A.

===Example of the Interface Circuit===

With reference to FIGS. 9, 10, and 11, an example of the interface circuit used in the PLL 4, LCD driver 6, DSP 8, and FM multiple receive circuit 10 of FIG. 9 will be described. FIG. 10 is a circuit diagram showing an example of the interface circuit. FIG. 11 is a time chart for explaining the operation of the interface circuit of FIG. 10. Note that the interface circuit of FIG. 10 does not have data bus DB4 for outputting data D0 to the controller 2.

The interface circuit has control signal CE, clock CL, and data DI inputted therein, and outputs clock SCL and data SDI. The interface circuit comprises an AND gate 102 and an AND gate 104 (clock output circuit). The AND gate 102 outputs data DI as data SDI depending on the level of control signal CE. That is, the AND gate 102 closes when control signal CE is at "L" (low level), and opens and outputs data DI as data SDI when control signal CE is at "H" (high level). The AND gate 104 outputs clock CL as clock SCL depending on the level of control signal CE. That is, when control signal CE is at "L", the AND gate 104 closes and, when control signal CE is at "H", opens and outputs clock CL as clock SCL.

The controller 2 holds clock CL at "L" and lets data DI be indefinite when control signal CE is at "L". The controller 2 outputs clock CL and data DI synchronous with the clock CL when control signal CE is at "H". That is, when control signal CE is at "L", the AND gate 102 outputs data SDI of "L" and the AND gate 104 outputs clock SCL of "L". When control signal CE is at "H", the AND gate 102 outputs data SDI that is the same as data DI and the AND gate 104 outputs clock SCL that is the same as clock CL. By this means, the data register serially reads in data SDI synchronously with clock SCL and holds the data. The data processing circuit performs required data processing on the bit value held in the data register. Note that when outputting clock CL and data DI, the controller 2 has to enable a data processing circuit as a target and disable the other data processing circuits, which are not a target. Hence, the program processing load of the controller 2 itself is large.

===Another Example of the Interface Circuit===

With reference to FIGS. 9, 13, and 14, another example of the interface circuit used in the PLL 4, LCD driver 6, DSP 8, and FM multiple receive circuit 10 of FIG. 9 will be described. FIG. 13 is a circuit diagram showing another example of the interface circuit. FIG. 14 is a time chart for explaining the operation of the interface circuit of FIG. 13. Note that the interface circuit of FIG. 13 does not have data bus DB4 for outputting data DO to the controller 2. The interface circuit of FIG. 13 identifies a data processing circuit as a target with hardware, thereby reducing the program processing load of the controller 2 itself.

The PLL 4, LCD driver 6, DSP 8, and FM multiple receive circuit 10 have respective intrinsic address codes to identify them. When control signal CE is at "L", the controller 2 outputs clock CL and data DI (address code A0 to A7) synchronous therewith, and when control signal CE is at "H", the controller 2 outputs clock CL and data DI (data D0 to Dn−1) synchronous therewith and subsequent to data DI (address code A0 to A7). Note that when control signal CE is at "L", the controller 2 holds clock CL at "L" except while data DI (address code A0 to A7) is output, and that the address code is not limited to an 8-bit code.

The interface circuit has control signal CE, clock CL, and data DI inputted therein, and outputs clock SCL and data SDI. The interface circuit comprises an address register 202, an address decoder 204, a delay circuit 206, an inverter 208, an AND gate 210, an OR gate 212, a D flip-flop 214, an AND gate 216, and an AND gate 218 (clock output circuit). The address register 202 serially reads in data DI (address code A0 to A7) at the rise timings of clock CL. The address decoder 204 checks whether the 8-bit address code A0 to A7 inputted in the address register 202 matches the intrinsic address code, and when both match, outputs "H", for example. Note that the address decoder 204 is hardware including a PLA (Programmable Logic Array), logic gates and the like. The OR gate 212 outputs "L" only for the delay time of the delay circuit 206 after the change point of control signal CE from "H" to "L". The AND gate 210 outputs "H" only for the delay time of the delay circuit 206 after the change point of control signal CE from "L" to "H". By this means, the D flip-flop 214 is reset at the change point of control signal CE from "H" to "L", and at the change point of control signal CE from "L" to "H", reads in and holds the decode output of the address decoder 204 with outputting data EN, which is the same as the decode output. Specifically, when the 8-bit address code A0 to A7 inputted in the address register 202 matches the preset intrinsic address code assigned to the data processing circuit such as the PLL 4, LCD driver 6, DSP 8, or FM multiple receive circuit 10, the D flip-flop 214 outputs data EN of "H". The AND gate 216 outputs data DI (data D0 to Dn−1) as data SDI depending on the level of data EN. That is, when data EN is at "L", the AND gate 216 closes, and when data EN is at "H", opens and outputs data DI (data D0 to Dn−1) as data SDI. The AND gate 218 outputs clock CL as clock SCL depending on the levels of control signal CE and data EN. That is, when either control signal CE or data EN is at "L", the AND gate 218 closes, and when control signal CE and data EN are at "H", opens and outputs clock CL as clock SCL.

When control signal CE is at "L", data EN is also at "L". Hence, the AND gate 216 outputs data SDI of "L", and the AND gate 218 outputs clock SCL of "L". When control signal CE is at "H", data EN is also at "H". Hence, the AND gate 216 outputs data SDI that is the same as data DI (data D) to DN−1), and the AND gate 218 outputs clock SCL that is the same as clock CL. By this means, the data register serially reads in data SDI synchronously with clock SCL and holds the data. The data processing circuit performs required data processing on the bit value held in the data register. The above is described, for example, in Japanese Patent Application Examined (KOKOKU) Publication No. Hei 3-31298.

According to the specification of controllers 2 themselves, when stopping clock CL, some controllers 2 hold clock CL at "L" while the others hold clock CL at "H".

FIG. 11 is a time chart for explaining the operation of the interface circuit of FIG. 10 for the specification that the controller 2 holds clock CL at "L". In contrast, FIG. 12 is a time chart for explaining the operation of the interface circuit of FIG. 10 for the specification that the controller 2 holds clock CL at "H". For the latter specification that the controller 2 holds clock CL at "H", the AND gate 104 outputs one clock (dummy clock) at a timing just before the AND gate 102 outputs data D0, and thereby the data register may read in data of "L" before data D0 and hold it, thus causing wrong data processing by the data processing circuit.

Furthermore, FIG. 14 is a time chart for explaining the operation of the interface circuit of FIG. 13 for the specification that the controller 2 holds clock CL at "L". In contrast, FIG. 15 is a time chart for explaining the operation of the interface circuit of FIG. 13 for the specification that the controller 2 holds clock CL at "H". For the latter specification that the controller 2 holds clock CL at "H", the AND gate 216 outputs address code A7 just before data DO and the AND gate 218 outputs one clock (dummy clock) at a timing while the AND gate 216 outputs address code A7, and thereby the data register may read in address code A7, thus causing wrong data processing by the data processing circuit.

Moreover, even if the data processing circuit or the interface circuit is provided with a clock counter for counting the number of clocks of clock SCL, clocks of clock SCL that are the same in number as bits of data SDI may not be able to be output depending the specification of the controller 2, thus causing wrong data processing by the data processing circuit. Furthermore, even if the data processing circuit or the interface circuit is provided with a plurality of clock counters or a complex clock counter according to the specification of the controller 2, the problem occurs inevitably that the circuit scale becomes extremely large.

SUMMARY OF THE INVENTION

An object of the present invention is to provide an interface circuit.

One aspect of the present invention to solve the above problems is an interface circuit outputting a clock signal and data to a data register configured to serially read in the data synchronously with the clock signal, in response to a change of a control signal for outputting the clock signal and the data from one logic level to the other logic level, the interface circuit comprising a clock output circuit configured to: detect a logic level of the clock signal when the control signal changes from the one logic level to the other logic level; output the clock signal on an as-is basis to the data register, when detecting one logic level of the clock signal; and output the clock signal after having changed from the other logic level to the one logic level, to the data register, when detecting the other logic level of the clock signal.

This interface circuit outputs appropriate data to the data register at appropriate timings. By this means, the interface circuit is reduced in circuit size and cost. In addition, at later stages, circuit size is prevented from becoming large and data processing is ensured.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

===Example of an Interface Circuit===

Figure 1:
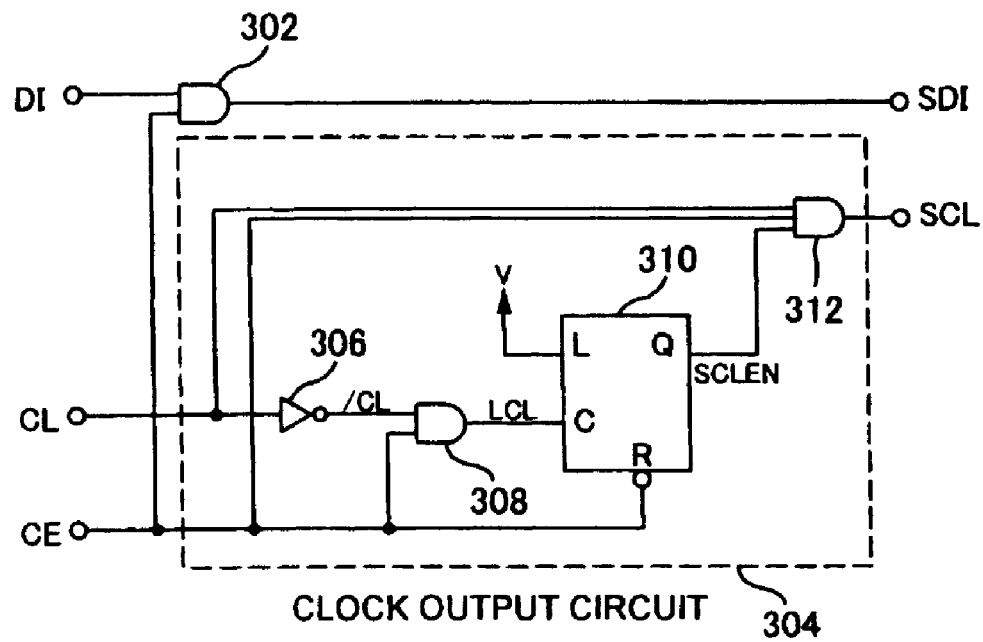
FIG. 1 is a circuit diagram showing an example of an interface circuit according to the present invention.
Figure 2:
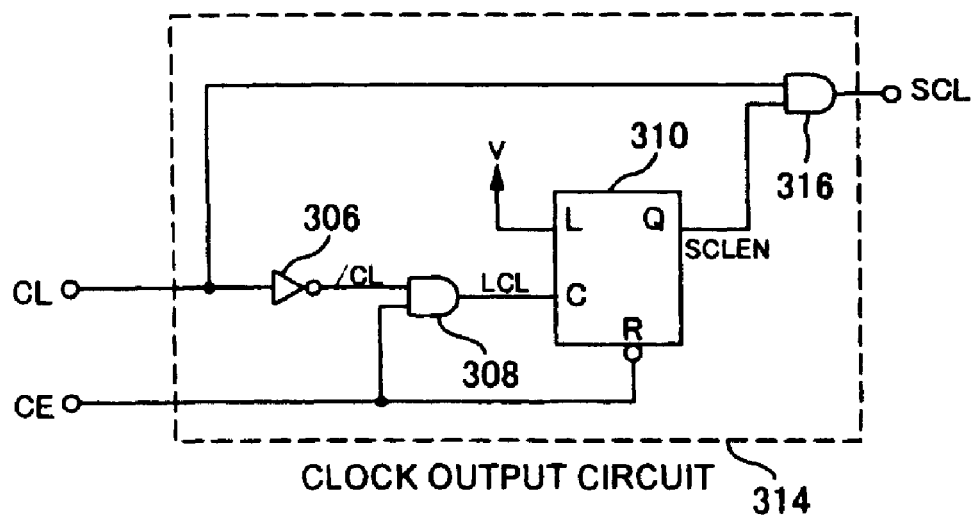
FIG. 2 is a circuit diagram showing a modified example of the interface circuit of FIG. 1.
Figure 3:
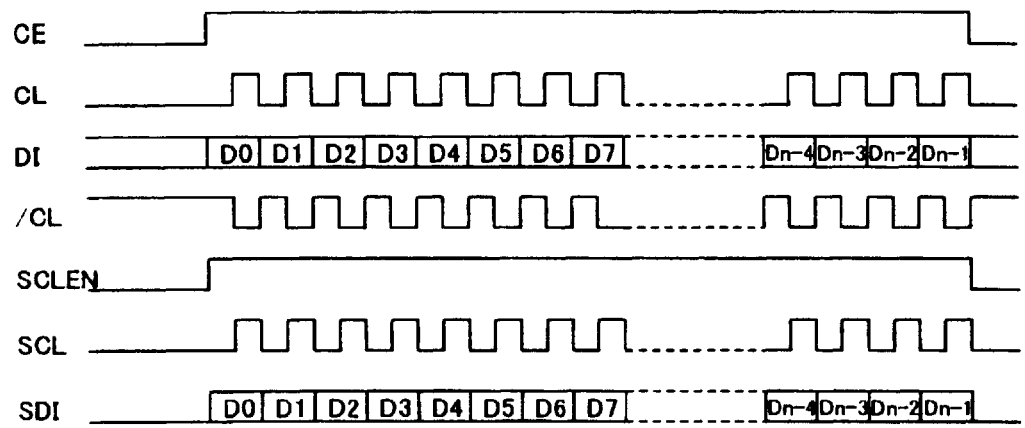
FIG. 3 is a time chart for explaining the operation of the interface circuit of FIG. 1 for the specification that a controller holds clock CL at "L"
Figure 4:
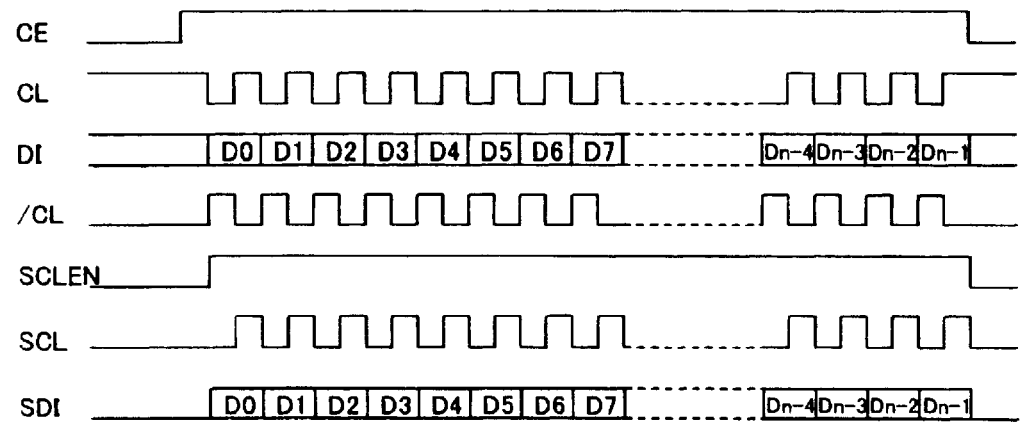
FIG. 4 is a time chart for explaining the operation of the interface circuit of FIG. 1 for the specification that the controller holds clock CL at "H"
Figure 9:
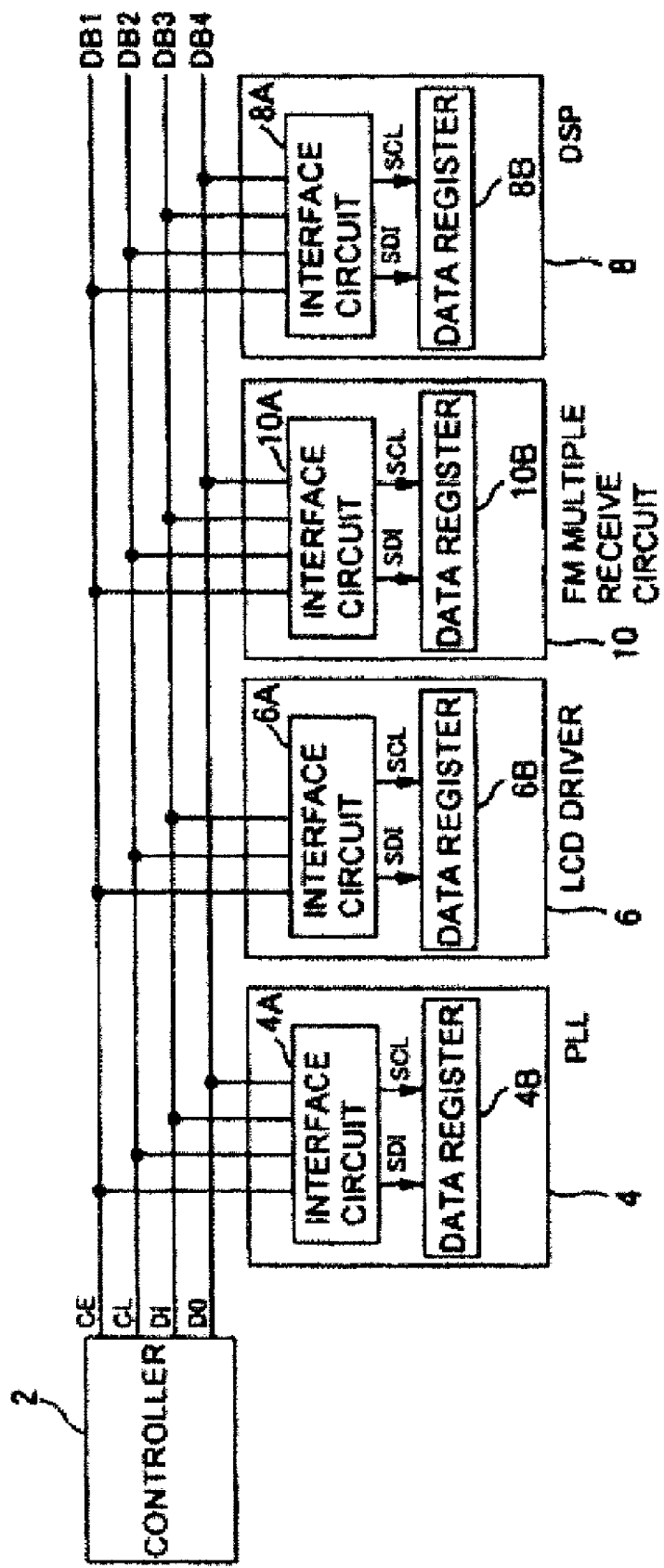
FIG. 9 is a block diagram for explaining a data processing system comprising a plurality of data processing circuits and a controller.
Figure 10:
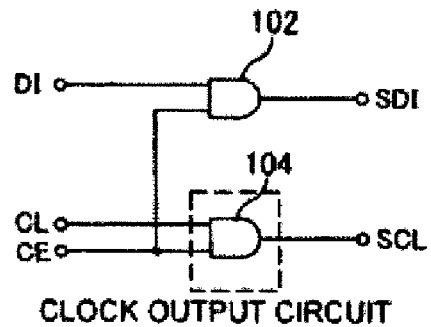
FIG. 10 is a circuit diagram showing an example of a conventional interface circuit.
Figure 11:
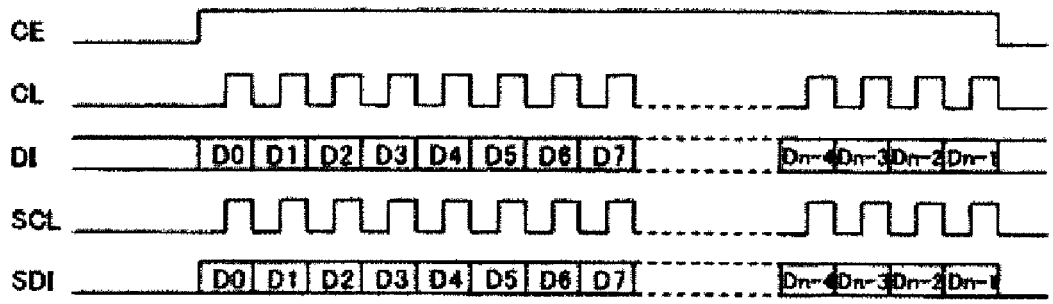
FIG. 11 is a time chart for explaining the operation of the interface circuit of FIG. 10 for the specification that a controller holds clock CL at "L"
Figure 12:
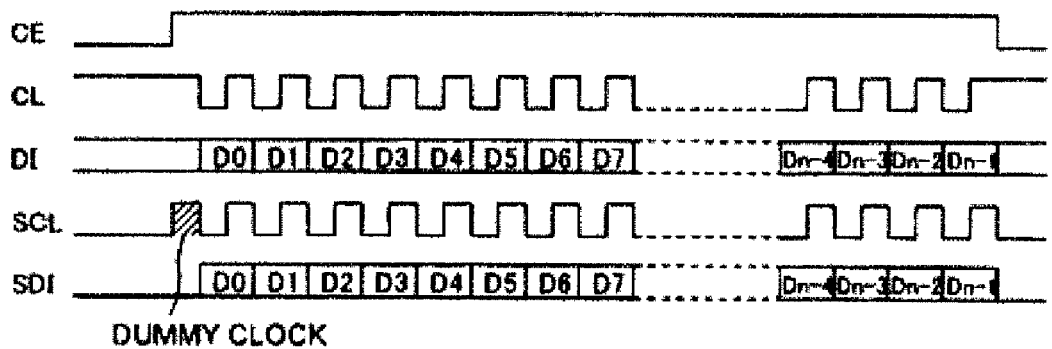
FIG. 12 is a time chart for explaining the operation of the interface circuit of FIG. 10 for the specification that the controller holds clock CL at "H"
Figure 13:
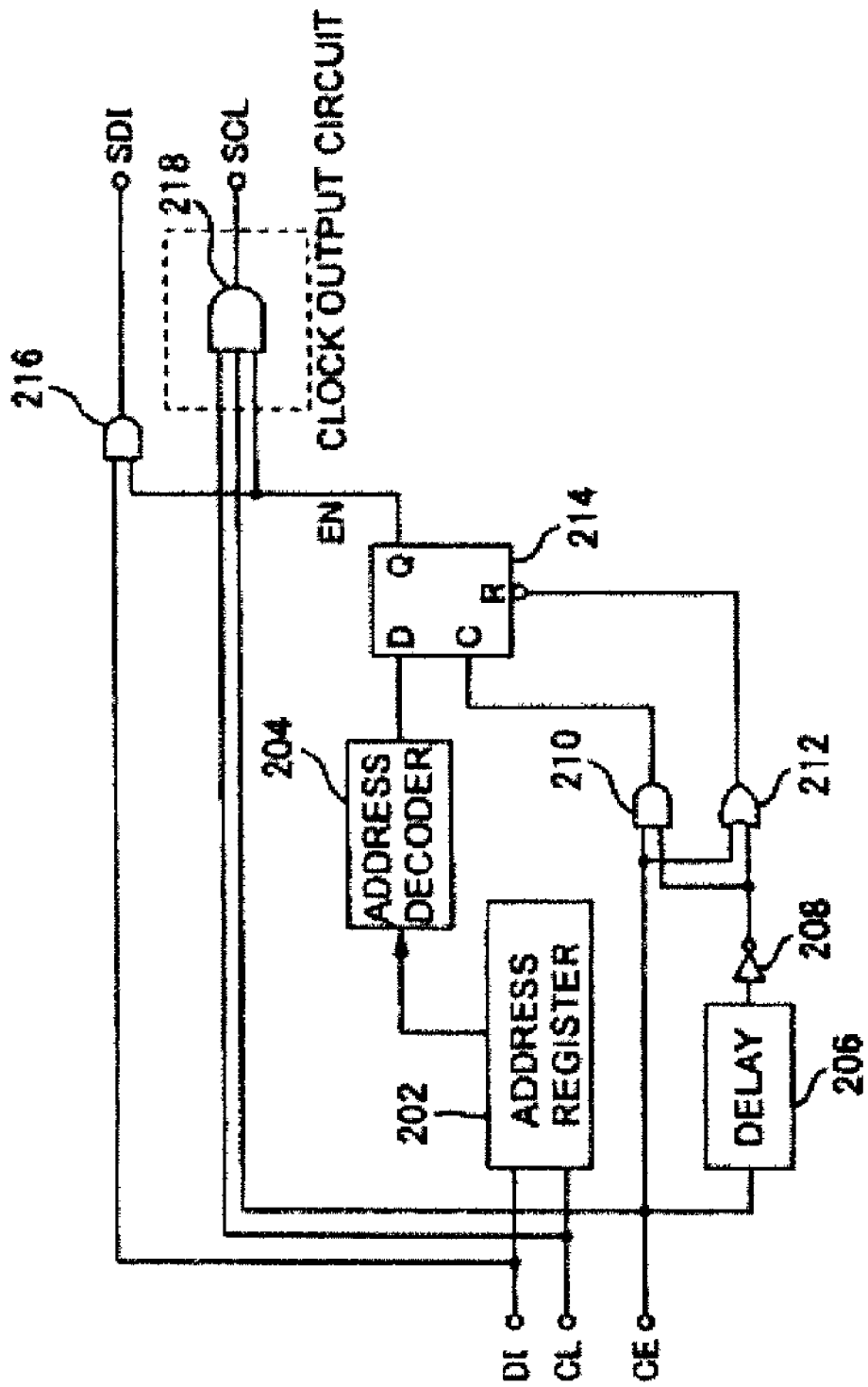
FIG. 13 is a circuit diagram showing another example of the conventional interface circuit.
Figure 14:
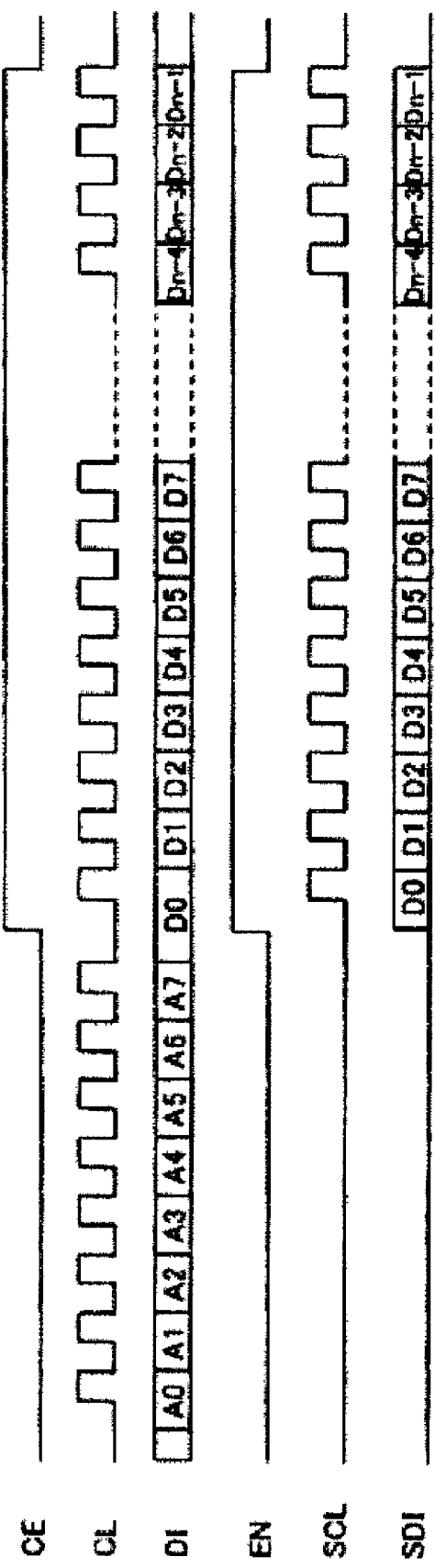
FIG. 14 is a time chart for explaining the operation of the interface circuit of FIG. 13 for the specification that a controller holds clock CL at "L"
Figure 15:
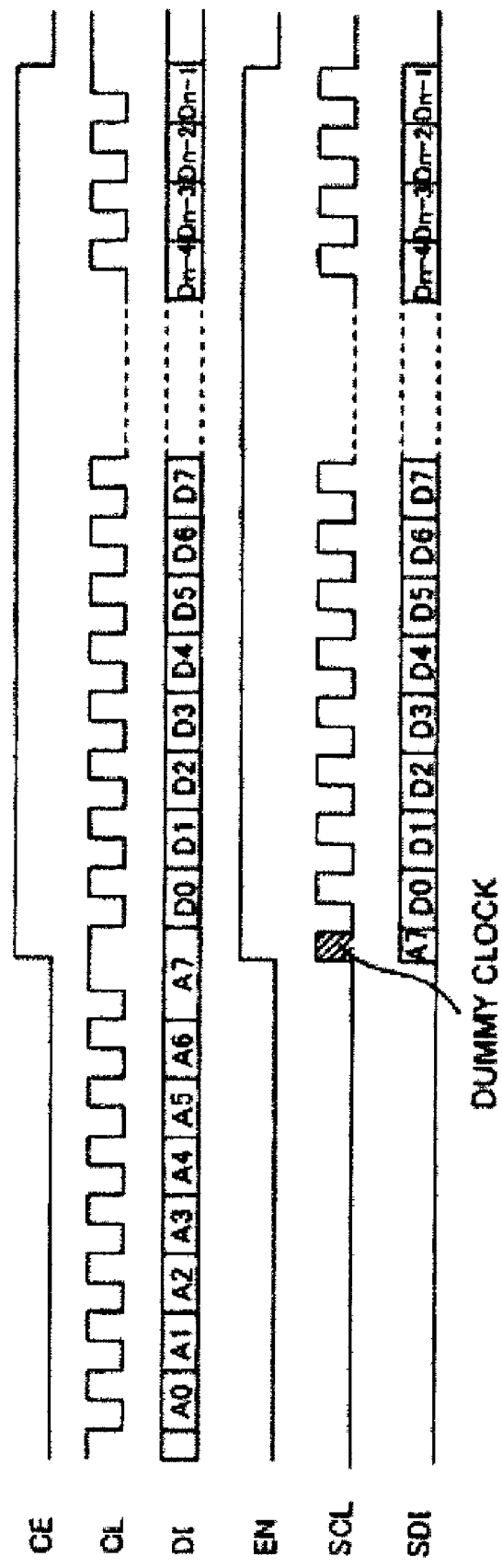
FIG. 15 is a time chart for explaining the operation of the interface circuit of FIG. 13 for the specification that the controller holds clock CL at "H".

With reference to FIGS. 1, 2, 3, and 4, an interface circuit of the present invention used in the PLL 4, LCD driver 6, DSP 8, and FM multiple receive circuit 10 of FIG. 9 will be described. FIG. 1 is a circuit diagram for explaining an example of the interface circuit of the present invention. FIG. 2 is a circuit diagram for explaining a modified example of the interface circuit of FIG. 1. FIG. 3 is a time chart for explaining the operation of the interface circuit of FIG. 1 for the specification that the controller 2 holds clock CL at "L". FIG. 4 is a time chart for explaining the operation of the interface circuit of FIG. 1 for the specification that the controller 2 holds clock CL at "H". Note that the interface circuit of FIG. 1 does not have data bus DB4 for outputting data DO to the controller 2.

<Configuration of the Interface Circuit>

The controller 2 holds clock CL at "L" and lets data DI be indefinite when control signal CE is at "L". The controller 2 outputs clock CL and data DI synchronous with the clock CL when control signal CE is at "H".

The interface circuit has control signal CE, clock CL, and data DI inputted therein, and outputs clock SCL and data SDI. The interface circuit comprises an AND gate 302 (data output circuit) and a logic circuit 304 (clock output circuit). The AND gate 302 outputs data DI as data SDI depending on the level of control signal CE. That is, the AND gate 302 closes when control signal CE is at "L", and opens and outputs data DI as data SDI when control signal CE is at "H".

The logic circuit 304 outputs clock CL as clock SCL depending on the level of control signal CE. Specifically, the logic circuit 304 comprises an inverter 306, an AND gate 308, a latch circuit 310, and an AND gate 312 (gate circuit). The inverter 306 outputs inverted clock /CL with respect to clock CL. The AND gate 308 outputs inverted clock /CL as latch clock LCL depending on the level of control signal CE. That is, when control signal CE is at "L", the AND gate 308 closes and, when control signal CE is at "H", opens and outputs inverted clock /CL as latch clock LCL. The latch circuit 310 latches a voltage V of "H" (data for allowing the output of clock SCL) in response to a level change of latch clock LCL and outputs as data SCLEN. Specifically, at the timing when latch clock LCL rises from "L" to "H", that is, when control signal CE becomes "H" and clock CL becomes "L", the latch circuit 310 latches the voltage V and outputs data SCLEN of "H". Note that when control signal CE is at "L", the latch circuit 310 is reset to output data SCLEN of "L". The AND gate 312 outputs clock CL as clock SCL depending on the levels of control signal CE and data SCLEN. That is, when either control signal CE or data SCLEN is at "L", the AND gate 312 closes and, when control signal CE and data SCLEN are at "H", opens and outputs clock CL as clock SCL.

A logic circuit 314 of FIG. 2 is a circuit that can replace the logic circuit 304 of FIG. 1. Note that the same reference numerals denote the same elements as in FIG. 1 with a description thereof omitted.

An AND gate 316 outputs clock CL as clock SCL depending on the level of data SCLEN. That is, when data SCLEN is at "L", the AND gate 316 closes and, when data SCLEN is at "H", opens and outputs clock CL as clock SCL.

By this means, the logic circuit 314 does not need a signal line for supplying control signal CE to the AND gate 316. That is, when an interface circuit having the logic circuit 314 is integrated in a chip, that signal line need not be drawn on the chip, thus reducing the influence of noise due to, e.g., modulated waves and reducing the integrated circuit in size.

<Operation of the Interface Circuit>

With reference to FIGS. 1 and 3, the operation of the interface circuit will be described for the specification that the controller 2 holds clock CL at "L" in stopping the clock.

When control signal CE is at "L", the AND gate 302 outputs data SDI of "L". At this time, because the latch circuit 310 is reset, the AND gate 312 outputs clock SCL of "L".

Upon the timing when control signal CE rises from "L" to "H", control signal CE is at "H" and clock CL stays at "L". Hence, the AND gate 308 outputs latch clock LCL rising to "H", and the reset of the latch circuit 310 is negated, and thus the latch circuit 310 latches the voltage V at the timing when latch clock LCL rises to "H" and outputs data SCLEN of "H".

When control signal CE is at "H", the AND gate 302 outputs data SDI that is the same as data DI. At this time, because the voltage V is latched in the latch circuit 310, the AND gate 312 outputs clock SCL that is the same as clock CL.

When the controller 2 according to the specification that it holds clock CL at "L" and a processing circuit having the interface circuit of FIG. 1 are connected, data SCLEN for opening (or activating) the AND gate 312 rises from "L" to "H" at the same timing as control signal CE rises from "L" to "H". That is, the AND gate 312 outputs clock SCL synchronous with data SDI with clocks of clock SCL being the same in number as bits of data SDI. By this means, the data register serially reads in data SDI synchronously with clock SCL and holds. The data processing circuit performs required data processing on the bit value held in the data register.

Next, with reference to FIGS. 1 and 4, the operation of the interface circuit will be described for the specification that the controller 2 holds clock CL at "H" in stopping the clock.

When control signal CE is at "L", the AND gate 302 outputs data SDI of "L". At this time, because the latch circuit 310 is reset, the AND gate 312 outputs clock SCL of "L".

Upon the timing when control signal CE rises from "L" to "H", clock CL stays at "H". Hence, the AND gate 308 outputs latch clock LCL of "L", and thus while the reset of the latch circuit 310 is negated, the latch circuit 310 does not latch the voltage V. After that, upon the timing when clock CL falls from "H" to "L" first after being stopped, because control signal CE is at "H" and clock CL is at "L", the AND gate 308 outputs latch clock LCL rising to "H". At this time, the latch circuit 310 latches the voltage V at the timing when latch clock LCL rises to "H" and outputs data SCLEN of "H".

When control signal CE is at "H", the AND gate 302 outputs data SDI that is the same as data DI. Further, when control signal CE and data SCLEN are at "H", i.e. the voltage V is latched in the latch circuit 310, the AND gate 312 outputs clock SCL that is the same as clock CL.

When the controller 2 according to the specification that it holds clock CL at "H" and a processing circuit having the interface circuit of FIG. 1 are connected, data SCLEN for activating the AND gate 312 rises from "L" to "H" at a timing delayed from the timing that control signal CE rises from "L" to "H", that is, at the same timing as clock CL falls from "H" to "L" first after being stopped. That is, the AND gate 312 outputs clock SCL synchronous with data SDI with clocks of clock SCL being the same in number as bits of data SDI. By this means, the data register serially reads in data SDI synchronously with clock SCL and holds. The data processing circuit performs required data processing on the bit value held in the data register.

Note that when outputting clock CL and data DI, the controller 2 enables a data processing circuit as a target and disables the other data processing circuits, which are not a target.

===Another Example of the Interface Circuit===

Figure 5:
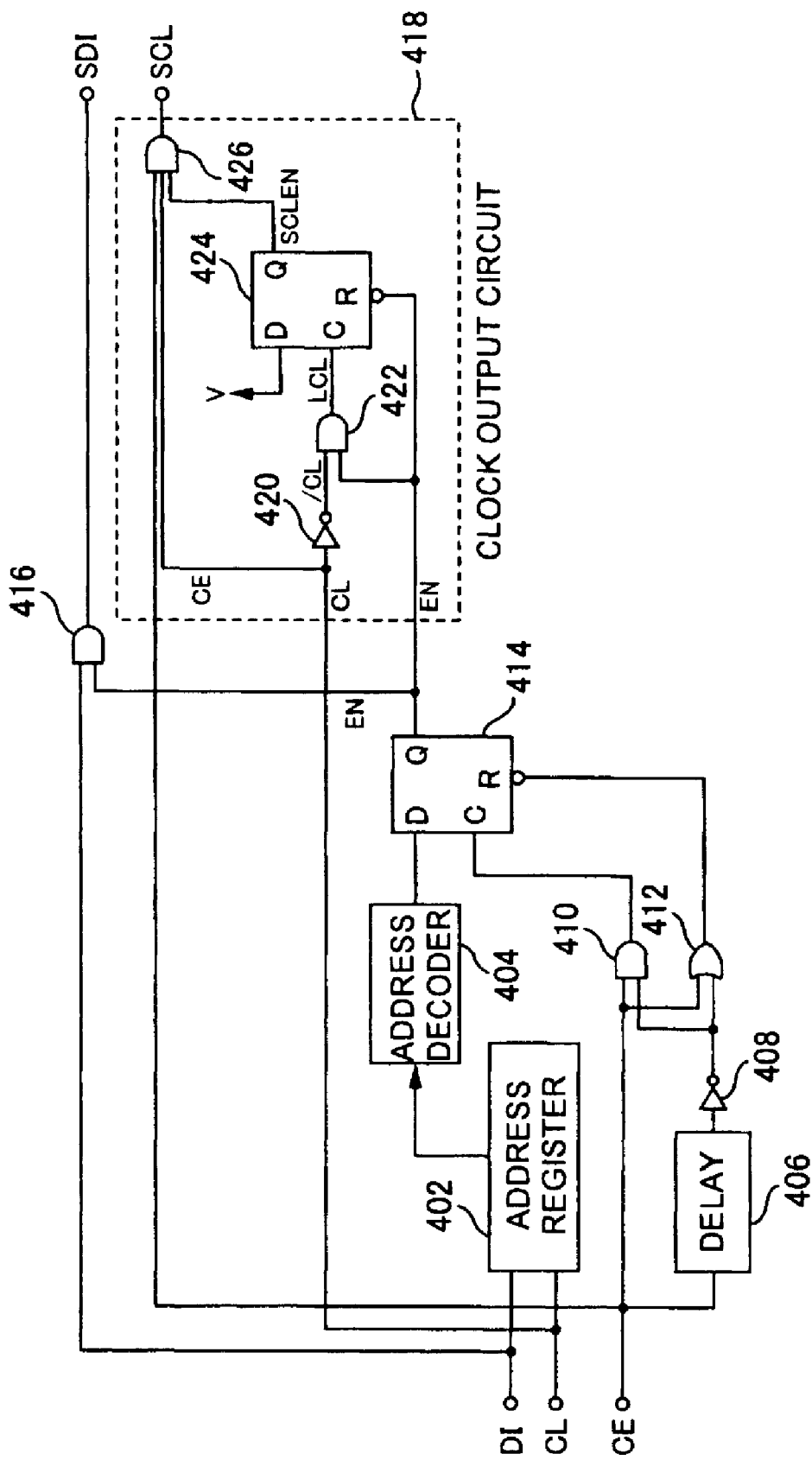
FIG. 5 is a circuit diagram showing another example of the interface circuit according to the present invention.
Figure 6:
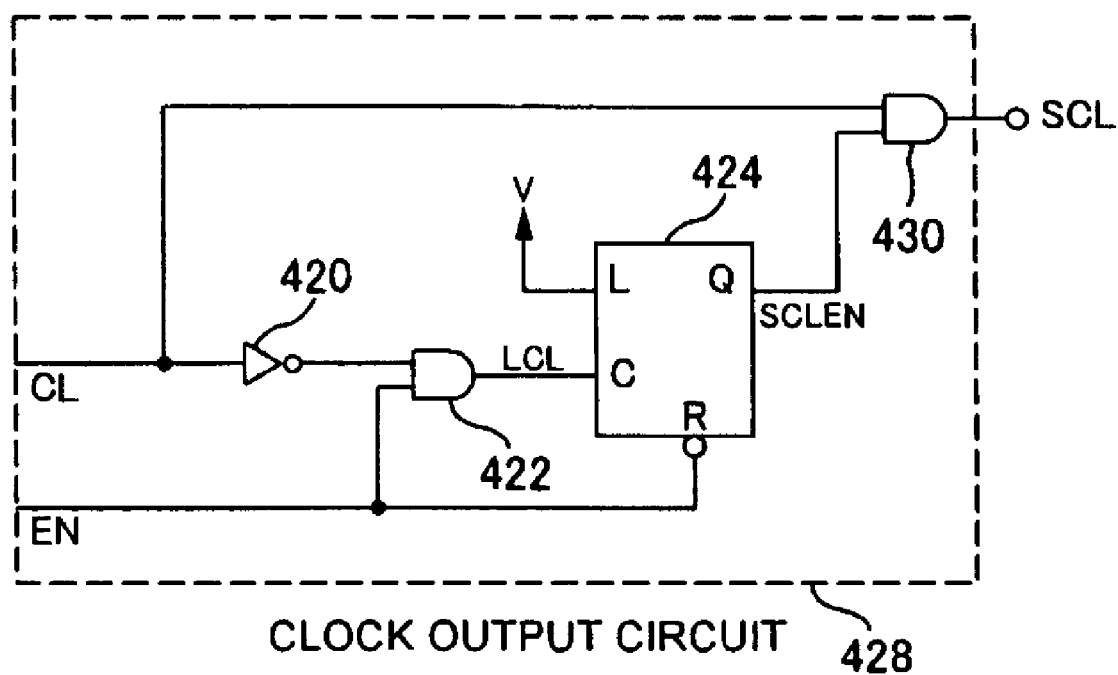
FIG. 6 is a circuit diagram showing a modified example of the interface circuit of FIG. 5.
Figure 7:
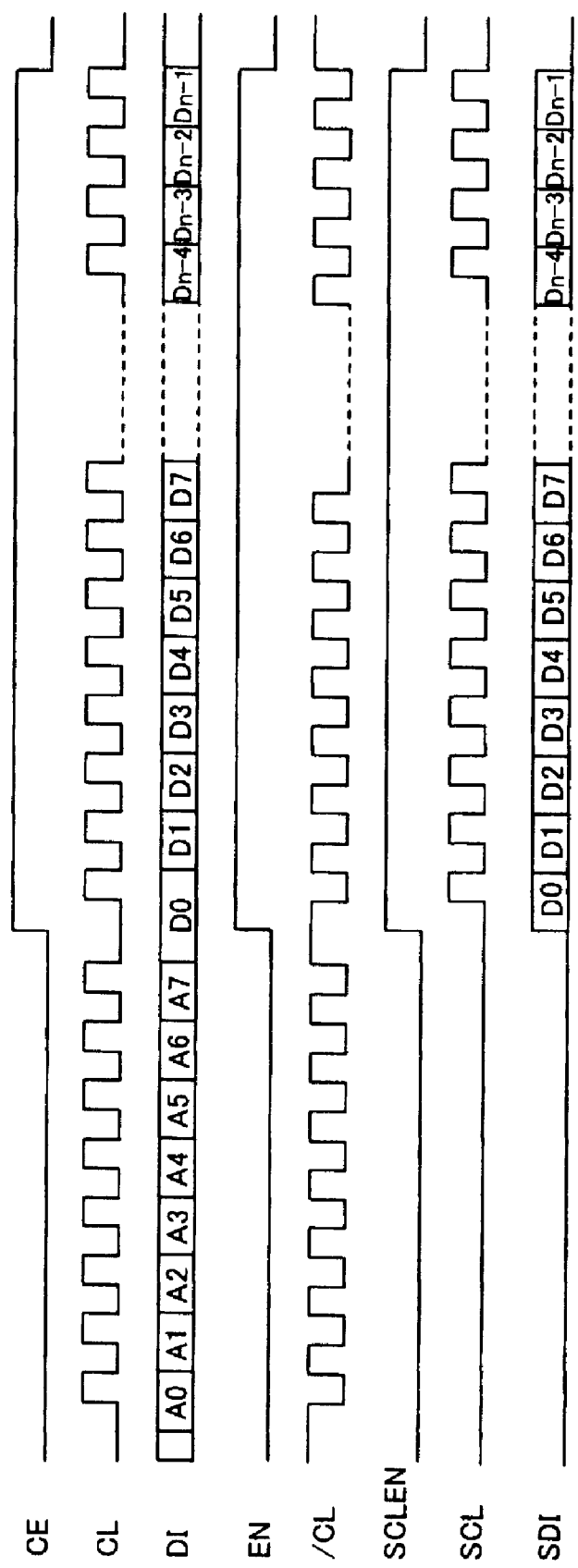
FIG. 7 is a time chart for explaining the operation of the interface circuit of FIG. 5 for the specification that a controller holds clock CL at "L"
Figure 8:
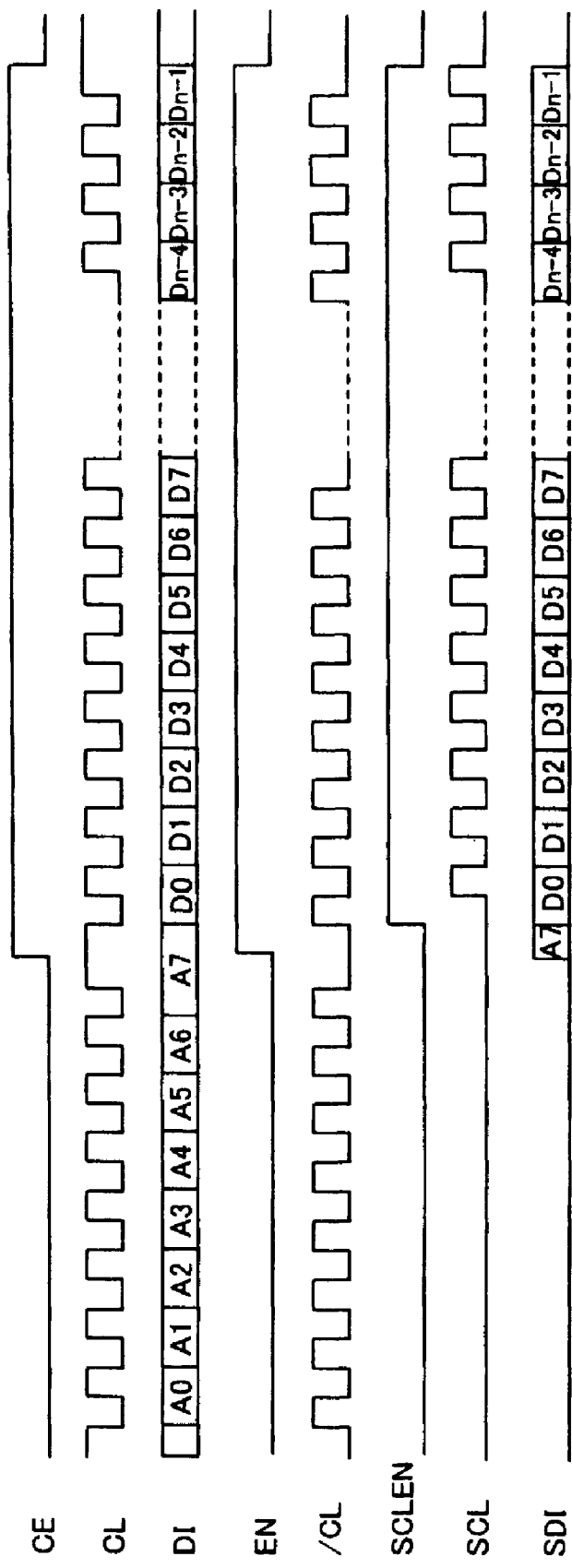
FIG. 8 is a time chart for explaining the operation of the interface circuit of FIG. 5 for the specification that the controller holds clock CL at "H"

With reference to FIGS. 5, 6, 7, and 8, another example of the interface circuit used in the PLL 4, LCD driver 6, DSP 8, and FM multiple receive circuit 10 of FIG. 9 will be described. FIG. 5 is a circuit diagram explaining another example of the interface circuit. FIG. 6 is a circuit diagram for explaining a modified example of the interface circuit of FIG. 5. FIG. 7 is a time chart for explaining the operation of the interface circuit of FIG. 5 for the specification that the controller 2 holds clock CL at "L". FIG. 8 is a time chart for explaining the operation of the interface circuit of FIG. 5 for the specification that the controller 2 holds clock CL at "H". Note that the interface circuit of FIG. 5 does not have data bus DB4 for outputting data D0 to the controller 2 and identifies a data processing circuit as a target with hardware.

<Configuration of the Interface Circuit>

The PLL 4, LCD driver 6, DSP 8, and FM multiple receive circuit 10 have respective intrinsic address codes to identify them. When control signal CE is at "L", the controller 2 outputs clock CL and data DI (address code A0 to A7) synchronous therewith, and when control signal CE is at "H", the controller 2 outputs clock CL and data DI (data D0 to Dn−1) synchronous therewith and subsequent to data DI (address code A0 to A7). Note that when control signal CE is at "L", the controller 2 holds clock CL at "L" (FIG. 7) or "H" (FIG. 8) except while data DI (address code A0 to A7) is output, and that the address code is not limited to an 8-bit code.

The interface circuit has control signal CE, clock CL, and data DI inputted therein, and outputs clock SLC and data SDI. The interface circuit comprises an address register 402, an address decoder 404, a delay circuit 406, an inverter 408, an AND gate 410, an OR gate 412, a D flip-flop 414, an AND gate 416 (data output circuit), and a logic circuit 418 (clock output circuit). The address register 402 serially reads in data DI (address code A0 to A7) at the rise timings of clock CL. The address decoder 404 checks whether the 8-bit address code A0 to A7 inputted in the address register 402 matches the preset intrinsic address code, and when both match, outputs "H", for example. Note that the address decoder 404 is hardware including a PLA (Programmable Logic Array), logic gates and the like. The OR gate 412 outputs "L" only for the delay time of the delay circuit 406 after the change point of control signal CE from "H" to "L". The AND gate 410 outputs "H" only for the delay time of the delay circuit 406 after the change point of control signal CE from "L" to "H". By this means, the D flip-flop 414 is reset at the change point of control signal CE from "H" to "L", and at the change point of control signal CE from "L" to "H", reads in and holds the decode output of the address decoder 404 with outputting data EN, which is the same as the decode output. Specifically, when the 8-bit address code A0 to A7 inputted in the address register 402 matches the intrinsic address code assigned to the data processing circuit such as the PLL 4, LCD driver 6, DSP 8, or FM multiple receive circuit 10, the D flip-flop 214 outputs data EN of "H". The AND gate 416 outputs data DI (data D0 to Dn−1) as data SDI depending on the level of data EN. That is, when data EN is at "L", the AND gate 416 closes, and when data EN is at "H", opens and outputs data DI (data D0 to Dn−1) as data SDI.

The logic circuit 418 outputs clock CL as clock SCL depending on the levels of control signal CE and data EN. The logic circuit 418 comprises an inverter 420, an AND gate 422, a latch circuit 424, and an AND gate 426 (gate circuit). The inverter 420 outputs inverted clock /CL with respect to clock CL. The AND gate 422 outputs inverted clock /CL as latch clock LCL depending on the level of data EN. That is, when data EN is at "L", the AND gate 422 closes and, when data EN is at "H", opens and outputs inverted clock /CL as latch clock LCL. The latch circuit 424 latches a voltage V of "H" (data for allowing the output of clock SCL) in response to a level change of latch clock LCL and outputs as data SCLEN. Specifically, at the timing when latch clock LCL rises from "L" to "H", that is, when data EN changes from "L" to "H" and clock CL changes from "H" to "L", the latch circuit 424 latches the voltage V and outputs data SCLEN of "H". Note that when data EN is at "L", the latch circuit 424 is reset to output data SCLEN of "L". The AND gate 426 outputs clock CL as clock SCL depending on the levels of control signal CE and data SCLEN. That is, when either control signal CE or data SCLEN is at "L", the AND gate 426 closes and, when control signal CE and data SCLEN are at "H", opens and outputs clock CL as clock SCL.

A logic circuit 428 of FIG. 6 is a circuit that can replace the logic circuit 418 of FIG. 5. Note that in FIG. 6, the same reference numerals denote the same elements as in FIG. 5 with a description thereof omitted.

An AND gate 430 outputs clock CL as clock SCL depending on the level of data SCLEN. That is, when data SCLEN is at "L", the AND gate 430 closes and, when data SCLEN is at "H", opens and outputs clock CL as clock SCL.

By this means, the logic circuit 428 does not need a signal line for supplying control signal CE to the AND gate 430. That is, when an interface circuit having the logic circuit 428 is integrated in a chip, that signal line need not be drawn on the chip, thus reducing the influence of noise due to, e.g., modulated waves and reducing the integrated circuit in size.

<Operation of the Interface Circuit>

With reference to FIGS. 5 and 7, the operation of the interface circuit will be described for the specification that the controller 2 holds clock CL at "L" in stopping the clock.

When control signal CE is at "L", the address register 402 serially reads in data DI (address code A0 to A7) synchronously with clock CL. At this time, the D flip-flop 414 is reset and then the reset is negated, but the D flip-flop 414 does not read in and hold the decode output of the address decoder 404. Thus, the AND gate 416 outputs data SDI of "L". Furthermore, the latch circuit 424 is reset by data EN of "L" outputs from the D flip-flop 414. Thereby, the AND gate 426 outputs clock SCL of "L".

Upon the timing when control signal CE rises from "L" to "H", the D flip-flop 414 reads in and holds the decode output of the address decoder 404. Then, if the 8-bit address code A0 to A7 inputted in the address register 402 matches the preset intrinsic address code, the D flip-flop 414 outputs data EN of "H". At this time, because data EN becomes "H" and clock CL stays at "L", the AND gate 422 outputs latch clock LCL rising from "L" to "H". Moreover, because the reset thereof is negated, the latch circuit 424 latches the voltage V at the timing when latch clock LCL rises to "H" thereby outputting data SCLEN of "H".

When control signal CE is at "H", data EN is at "H". Hence, the AND gate 416 outputs data SDI (data D0 to Dn−1) that is the same as data DI. At this time, because the voltage V is latched in the latch circuit 424, the AND gate 426 outputs clock SCL that is the same as clock CL.

When the controller 2 according to the specification that is holds clock CL at "L" and a processing circuit having the interface circuit of FIG. 5 are connected, data SCLEN for activating the AND gate 426 rises from "L" to "H" at the same timing as control signal CE and data EN rise from "L" to "H". That is, the AND gate 426 outputs clock SCL synchronous with data SDI (data D0 to Dn−1) with clocks of clock SCL being the same in number as bits of data SDI. By this means, the data register serially reads in data SDI synchronously with clock SCL and holds. The data processing circuit performs required data processing on the bit value held in the data register.

Next, with reference to FIGS. 5 and 8, the operation of the interface circuit will be described for the specification that the controller 2 holds clock CL at "H" in stopping the clock.

When control signal CE is at "L", the address register 402 serially reads in data DI (address code A0 to A7) synchronously with clock CL. At this time, the D flip-flop 414 is reset and then the reset is negated, but the D flip-flop 414 does not read in and hold the decode output of the address decoder 404. Thus, the AND gate 416 outputs data SDI of "L". Furthermore, the latch circuit 424 is reset by data EN of "L" output from the D flip-flop 414. Thereby, the AND gate 426 outputs clock SCL of "L".

Upon the timing when control signal CE rises from "L" to "H", the D flip-flop 414 reads in and holds the decode output of the address decoder 404. Then, if the 8-bit address code A0 to A7 inputted in the address register 402 matches the preset intrinsic address code, the D flip-flop 414 outputs data EN of "H". At this time, because clock CL stays at "H", the AND gate 422 outputs latch clock LCL of "L". Moreover, while the reset thereof is negated, the latch circuit 424 does not latch the voltage V. Then, immediately after clock CL falls from "H" to "L" first after being stopped, the AND gate 422 outputs latch clock LCL rising to "H" because data EN is at "H" and clock CL is at "L". Further, the latch circuit 424 latches the voltage V at the timing when latch clock LCL rises to "H" to output data SCLEN of "H".

When data EN is at "H", the AND gate 416 outputs data SDI (data D0 to Dn−1) that is the same as data DI. Furthermore, when control signal CE and data SCLEN are at "H", the AND gate 426 outputs clock SCL that is the same as clock CL because the voltage V is latched in the latch circuit 424.

When the controller 2 according to the specification that it holds clock CL at "H" and a processing circuit having the interface circuit of FIG. 5 are connected, data SCLEN for activating the AND gate 426 rises from "L" to "H" at a timing delayed from the timing when control signal CE and data EN rise from "L" to "H", that is, at the same timing as clock CL falls from "H" to "L" first after being stopped. That is, the AND gate 426 outputs clock SCL synchronous with data SDI (data D0 to Dn−1) with clocks of clock SCL being the same in number as bits of data SDI. By this means, the data register serially reads in data SDI synchronously with clock SCL and holds. The data processing circuit performs required data processing on the bit value held in the data register.

Note that because a clock of clock SCL synchronous with data SDI (address code A7) output from the AND gate 416 does not exist, the data register never reads in and holds address code A7.

As described above, the interface circuit, which in response to control signal CE changing from "L" to "H", outputs clock SCL and data SDI to the data register 4B, 6B, 8B, or 10B that serially reads in data SDI synchronously with clock SCL, comprises the logic circuit 304 or 418 that detects the level of clock CL when control signal CE changes from "L" to "H" and then, outputs clocks of clock SCL being the same in number as bits of data SDI to the data register 4B, 6B, 8B, or 10B.

The logic circuits 304 and 418 detect the level of clock CL when control signal CE changes from "L" to "H" by hardware. That is, if clock CL stays at "L" when control signal CE changes from "L" to "H", the logic circuits 304 and 418 output clock SCL that is the same as clock CL, and if clock CL stays at "H" when control signal CE changes from "L" to "H", output clock SCL that is the same as clock CL after clock signal CL first changes from "H" to "L". That is, regardless of the specification, whether the controller 2 holds clock CL at "L" or "H", the logic circuits 304 and 418 output clock SCL synchronous with data SDI with clocks of clock SCL being the same in number as bits of data SDI. The data register 4B, 6B, 8B, or 10B reads in data SDI at appropriate timings and holds. The data processing circuit performs correctly data processing on the bit value held in the data register. Thus, a plurality of clock counters, a complex clock counter, or the like according to the specification of the controller 2 are not needed, hence reducing the size and cost of the circuit and ensuring the correctness of data processing at later stages. Note that when control signal CE is at "L", the interface circuit may output clock SCL and data SDI, in which case the interface circuit need only have an inverter for inverting control signal CE and inputting it (not shown).

Moreover, only where an address code A0 to A7 inputted while control signal CE is at "L" matches the preset intrinsic address code, the logic circuit 418 of the interface circuit detects the level of clock CL when control signal CE changes from "L" to "H", and outputs clocks of clock SCL being the same in number as bits of data SDI to the data register 4B, 6B, 8B, or 10B. This interface circuit can certainly identify a data processing circuit as a target by hardware.

Yet further, in the interface circuit, which in response to control signal CE changing from "L" to "H", outputs clock SCL and data SDI to the data register 4B, 6B, 8B, or 10B that serially reads in data SDI synchronously with clock SCL, a clock output method can be realized that detects the level of clock CL when control signal CE changes from "L" to "H" and then, outputs clocks SCL being the same in number as bits of data SDI to the data register 4B, 6B, 8B, or 10B.

Still further, in the clock output method for the interface circuit, it can be realized that only where an address code A0 to A7 inputted while control signal CE is at "L" matches the preset intrinsic address code, the level of clock CL is detected when control signal CE changes from "L" to "H", and clocks of clock SCL being the same in number as bits of data SDI are output to the data register 4B, 6B, 8B, or 10B.

===Data Processing Circuit===

The interface circuits of FIGS. 1, 2, 5, and 6 are provided in a data processing circuit such as the PLL 4, LCD driver 6, DSP 8, or FM multiple receive circuit 10, and hence the data processing circuit is reduced in circuit size and cost.

===Data Processing System===

Data processing circuits having the interface circuit of FIG. 1, 2, 5, or 6 are connected via the controller 2 and data buses DB1, DB2, DB3, DB4 as needed so that they together with the controller 2 realize a data processing system. Thus, the data processing system is reduced in circuit size and cost, and hence, more data processing circuits can be arranged on a predetermined board area.

===Integrated Circuit===

The interface circuits of FIGS. 1, 2, 5, and 6 may be realized as integrated circuits formed on chips. In this case, the interface circuits of FIGS. 1 and 2 can be used as general-purpose ICs for plural kinds of data processing circuits. Further, the interface circuits of FIGS. 5 and 6, by enabling the address code preset in the address decoder 404 to be variable externally, can be used as general-purpose ICs for plural kinds of data processing circuits. Moreover, data processing circuits having the interface circuit of FIG. 1, 2, 5, or 6 may be realized as integrated circuits formed on chips. In this case, the interface circuit of FIG. 1, 2 5, or 6 forms a custom IC part connecting to the controller 2.

OTHER EMBODIMENTS

Although the interface circuits, data processing circuits, data processing system, integrated circuits, and clock output method for the interface circuits according to the present invention have been described, the above description is provided to facilitate the understanding of the present invention and not intended to limit the present invention. It should be understood that various changes and alterations can be made therein without departing from the spirit and scope of the present invention and that the present invention includes equivalents thereof.

What is claimed is:

1. An interface circuit comprising a clock output circuit configured to:
   detect whether a logic level of an input clock signal is at a first logic level or a second logic level, when detecting a logic level change of an input control signal from a third logic level to a fourth logic level;
   when the detected logic level of the input clock signal is at the first logic level:
      change a logic level of an output clock enable signal from a fifth logic level to a sixth logic level at the same time as the logic level change of the input control signal from the third logic level to the fourth logic level, and output the input clock signal, as an output clock signal, to a data register that is configured to serially read in data synchronously with the output clock signal, the output clock enable signal being a signal for outputting the input clock signal, as the output clock signal, to the data register; and
   when the detected logic level of the input clock signal is at the second logic level:
      detect when the logic level of the input clock signal changes from the second logic level to the first logic level, and
      change the logic level of the output clock enable signal from the fifth logic level to the sixth logic level at the same time as the logic level change of the input clock signal from the second logic level to the first logic level, and output the input clock signal, as the output clock signal, to the data register, when detecting that the logic level of the input clock signal changes from the second logic level to the first logic level,
   wherein outputting the input clock signal, as the output clock signal, is based on the logic level of the input clock signal, the logic level of the input control signal, and the logic level of the output clock enable signal.

2. The interface circuit according to claim 1, wherein the input clock signal is output based on determining that an address inputted when the input control signal is at the third logic level matches a predetermined address.

3. The interface circuit according to claim 1, wherein the clock output circuit further comprises a logic circuit configured to:
   stop the output of the input clock signal, as the output clock signal, based on the input control signal being at the third logic level; and
   allow the output of the input clock signal, as the output clock signal, based on the input control signal being at the fourth logic level and further based on the input clock signal being at the first logic level.

4. The interface circuit according to claim 3, wherein the logic circuit further comprises:
   a latch circuit for outputting the output clock enable signal, the latch circuit configured to latch data for allowing the input clock signal to be output, based on the input control signal being at the fourth logic level and further based on the input clock signal being at the first logic level; and
   a gate circuit configured to output the input clock signal, as the output clock signal, based on the input control signal being at the fourth logic level and further based on the latched data.

5. The interface circuit according to claim 3, wherein the logic circuit further comprises:
   a latch circuit for outputting the output clock enable signal, the latch circuit configured to latch data for allowing the input clock signal to be output, based on the input control signal being at the fourth logic level and further based on the input clock signal being at the first logic level; and
   a gate circuit configured to output the input clock signal, as the output clock signal, based on the latched data.

6. The interface circuit according to claim 2, wherein the clock output circuit further comprises a logic circuit configured to:
   stop the output of the input clock signal, as the output clocks signal, based on the input control signal being at the third logic level; and
   when the address matches the predetermined address, allow the output of the input clock signal, as the output clock signal, based on the input control signal being at the fourth logic level and further based on the clock signal being at the first logic level.

7. The interface circuit according to claim 6, wherein the logic circuit further comprises:
   a latch circuit for outputting the output clock enable signal, the latch circuit configured to latch data for allowing the input clock signal to be output, based on a signal indicating that the address matches the predetermined address and further based on the input clock signal being at the first logic level; and a gate circuit configured to output the input clock signal, as the output clock signal, based on the input control signal being at the fourth logic level and further based on the latched data.

8. The interface circuit according to claim 6, wherein the logic circuit further comprises:
  a latch circuit for outputting the output clock enable signal, the latch circuit configured to latch data for allowing the input clock signal to be output, based on a signal indicating that the address matches the predetermined address and further based on the input clock signal being at the first logic level; and
  a gate circuit configured to output the input clock signal, as the output clock signal, based on the latched data.

9. An interface circuit comprising:
  a clock output circuit configured to:
    detect whether a logic level of an input clock signal is at a first logic level or a second logic level, when detecting a logic level change of an input control signal from a third logic level to a fourth logic level, and
    output the input clock signal, as an output clock signal, to a data register in response to the input control signal, the data register configured to serially read in data synchronously with the output clock signal,
  wherein the clock output circuit further comprises:
    a latch circuit configured to, based on the logic level of the input clock signal, and the logic level of the input control signal:
      when the detected logic level of the input clock signal is at the first logic level, change a logic level of an output clock enable signal from a fifth logic level to a sixth logic level at the same time as the logic level change of the input control signal from the third logic level to the fourth logic level, and allow the input clock signal to be output to the data register, the output clock enable signal being a signal for outputting the input clock signal, as the output clock signal, to the data register, and
      when the detected logic level of the input clock signal is at the second logic level, detect when the logic level of the input clock signal changes from the second logic level to the first logic level, change the logic level of the output clock enable signal from the fifth logic level to the sixth logic level at the same time as a logic level change of the input clock signal from the second logic level to the first logic level, and allow the input clock signal to be output to the data register; and
    a gate circuit configured to output the input clock signal, based on the output clock enable signal.

10. The interface circuit according to claim 9, wherein the gate circuit outputs the input clock signal, as the output clock signal, further based on the input control signal.

11. The interface circuit according to claim 9, wherein the latch circuit is further configured to be reset when the input control signal is at the third logic level, and to be released from the reset when the input control signal is at the fourth logic level.

12. An interface circuit comprising:
  a clock output circuit configured to:
    detect whether a logic level of an input clock signal is at a first logic level or a second logic level, when detecting a logic level change of an input control signal from a third logic level to a fourth logic level,
    output an output clock enable signal in response to the input control signal, and output the input clock signal, as an output clock signal, to a data register in response to the input control signal and the output clock enable signal, the data register configured to serially read in data synchronously with the output clock signal, the output clock enable signal being a signal for outputting the input clock signal, as the output clock signal, to the data register,
  wherein the clock output circuit further comprises:
    a first gate circuit configured to output an inverse of the input clock signal as a latch clock signal, when the input control signal is at the fourth logic level, and
    a latch circuit configured to, based on the logic level of the latch clock signal, and the logic level of the input control signal:
      change the output clock enable signal from a fifth logic level to a sixth logic level at the same time as a logic level change of the latch clock signal from the first logic level to the second logic level for allowing the input clock signal to be output to the data register when the detected logic level of the input latch clock signal is at the first logic level; and
  a second gate circuit configured to output the input clock signal, when the output clock enable signal is at the sixth logic level.

13. An interface circuit comprising:
  an address register configured to serially read in an address code synchronously with a clock signal;
  an address decoder configured to decode the address code inputted in the address register;
  a hold circuit configured to hold, as a decode output of the address decoder, a first decode output indicating that the address code inputted in the address register is a predetermined address code, or a second decode output indicating that the address code inputted in the address register is not a predetermined address code, according to a change of a control signal from one logic level to the other logic level;
  a data output circuit configured to output data subsequent to the address code, to a data register configured to serially read in the data synchronously with the clock signal, in response to the first decode output held in the hold circuit; and
  a clock output circuit configured to output the clock signal to the data register, in response to the first decode output held in the hold circuit, the clock output circuit further comprising:
    a latch circuit configured to be released from a reset when the hold circuit holds the first decode output, and to latch data for allowing the clock signal to be output when the hold circuit holds the first decode output and when the clock signal is at one logic level; and
    a gate circuit configured to output the clock signal, based on the data for allowing the clock signal to be output, which data is latched in the latch circuit.

14. An interface circuit comprising:
  an address register configured to serially read in an address code synchronously with a clock signal;
  an address decoder configured to decode the address code inputted in the address register;
  a hold circuit configured to hold, as a decode output of the address decoder, a first decode output indicating that the address code inputted in the address register is a predetermined address code, or a second decode output indicating that the address code inputted in the address register is not a predetermined address code, according to a change of a control signal from one logic level to the other logic level;
a data output circuit configured to output data subsequent to the address code, to a data register configured to serially read in the data synchronously with the clock signal, in response to the first decode output held in the hold circuit; and
a clock output circuit configured to output the clock signal to the data register, in response to the first decode output held in the hold circuit, the clock output circuit further comprising:
a first gate circuit configured to output latch clock, based on the first decode output held in the hold circuit and on the clock signal being at one logic level;
a latch circuit configured to latch data for allowing the clock signal to be output, according to the latch clock; and
a second gate circuit configured to output the clock signal, based on the data for allowing the clock signal to be output, which data is latched in the latch circuit.

15. An interface circuit comprising:
a detecting circuit configured to detect whether a logic level of an input clock signal is at a first logic level or a second logic level, when detecting that an address code has been serially read into the interface circuit, and that a logic level of an input control signal has changed from a third logic level to a fourth logic level; and
a clock output circuit configured to:
when the detected logic level of the input clock signal is at the first logic level:
change a logic level of an output clock enable signal from a fifth logic level to a sixth logic level at the same time as the logic level change of the input control signal from the third logic level to the fourth logic level, and output the input clock signal, as an output clock signal, to a data register that is configured to serially read in data synchronously with the output clock signal, the output clock enable signal being a signal for outputting the input clock signal, as the output clock signal, to the data register; and
when the detected logic level of the input clock signal is at the second logic level:
detect when the logic level of the input clock signal changes from the second logic level to the first logic level, and
change the logic level of the output clock enable signal from the fifth logic level to the sixth logic level at the same time as a logic level change of the input clock signal from the second logic level to the first logic level, and output the input clock signal, as the output clock signal, to the data register when the detecting circuit detects that the logic level of the input clock signal changes from the second logic level to the first logic level,
wherein outputting the input clock signal, as the output clock signal, is based on the logic level of the input clock signal, the logic level of the input control signal, and the logic level of the output clock enable signal.

16. A method comprising:
detecting whether a logic level of an input clock signal is at a first logic level or a second logic level, when detecting a logic level change of an input control signal from a third logic level to a fourth logic level;
when the detected logic level of the input clock signal is at the first logic level:
changing a logic level of an output clock enable signal from a fifth logic level to a sixth logic level at the same time as the logic level change of the input control signal from the third logic level to the fourth logic level, and outputting the input clock signal, as an output clock signal, to a data register that is configured to serially read in data synchronously with the output clock signal, the output clock enable signal being a signal for outputting the input clock signal, as the output clock signal, to the data register; and
when the detected logic level of the input clock signal is at the second logic level:
detecting when the logic level of the input clock signal changes from the second logic level to the first logic level, and
changing the logic level of the output clock enable signal from the fifth logic level to the sixth logic level at the same time as a logic level change of the input clock signal from the second logic level to the first logic level, and outputting the input clock signal, as the output clock signal to the data register when detecting that the logic level of the input clock signal changes from the second logic level to the first logic level,
wherein outputting the input clock signal, as the output clock signal, is based on the logic level of the input clock signal, the logic level of the input control signal, and the logic level of the output clock enable signal.

17. A method comprising:
detecting whether a logic level of an input clock signal is at a first logic level or a second logic level when detecting that an address code has been serially read into the interface circuit, and that a logic level of an input control signal has changed from a third logic level to a fourth logic level; and
when the detected logic level of the input clock signal is at the first logic level:
changing a logic level of an output clock enable signal from a fifth logic level to a sixth logic level at the same time as the logic level change of the input control signal from the third logic level to the fourth logic level, and outputting the input clock signal, as an output clock signal, to a data register that is configured to serially read in data synchronously with the output clock signal, the output clock enable signal being a signal for outputting the input clock signal, as the output clock signal, to the data register; and
when the detected logic level of the input clock signal is at the second logic level:
detecting when the logic level of the input clock signal changes from the second logic level to the first logic level,
changing the logic level of the output clock enable signal from the fifth logic level to the sixth logic level at the same time as a logic level change of the input clock signal from the second logic level to the first logic level, and outputting the input clock signal, as the output clock signal, to the data register when the detecting circuit detects that the logic level of the input clock signal changes from the second logic level to the first logic level,
wherein outputting the input clock signal, as the output clock signal, is based on the logic level of the input clock signal, the logic level of the input control signal, and the logic level of the output clock enable signal.

18. An interface circuit comprising:
an output circuit configured to:
  detect whether a logic level of an input clock signal is at a first logic level or a second logic level, when detecting a logic level change of an input control signal from a third logic level to a fourth logic level;
  when the detected logic level of the input clock signal is at the first logic level:
    change a logic level of a output clock enable signal from a fifth logic level to a sixth logic level at the same time as the logic level change of the input control signal from the third logic level to the fourth logic level, and output the output clock enable signal, the output clock enable signal being a signal for outputting the input clock signal, as an output clock signal, to a data register that is configured to serially read in data synchronously with the output clock signal, and
  when the detected logic level of the input clock signal is at the second logic level:
    detect when the logic level of the input clock signal changes from the second logic level to the first logic level,
    change the logic level of the output clock enable signal from the fifth logic level to the sixth logic level at the same time as the logic level change of the input clock signal from the second logic level to the first logic level, and output the output clock enable signal; and
a gate circuit configured to output the input clock signal, based on the output clock enable signal,
wherein the output clock enable signal is output based on the logic level of the input clock signal and the logic level of the input control signal.

19. The interface circuit of claim 1, wherein the clock output circuit is further configured to:
  detect when the logic level of the input control signal changes from the third logic level to the fourth logic level.

20. The interface circuit of claim 1, wherein:
the first, third and fifth logic levels are the same, and
the second, fourth and sixth logic levels are the same.

21. The interface circuit of claim 1, wherein:
the clock output circuit further comprises a gate circuit outputting a latch clock signal depending upon a logic level of the input control signal and the logic level of the input clock signal; and
the output clock enable signal is output based on a logic level of the latch clock signal.

22. The interface circuit of claim 21, wherein the gate circuit outputs the latch clock signal depending upon the logic level of the input control signal and an inverse of the logic level of the input clock signal.

23. The interface circuit of claim 21, wherein the gate circuit comprises an AND gate circuit.

24. The interface circuit of claim 1, wherein the clock output circuit is further configured to receive the input clock signal synchronous with detecting the logic level change of the input control signal from the third logic level to the fourth logic level.

25. The interface circuit of claim 1, wherein:
the first logic level, the third logic level, and the fifth logic level represent a low logic level value and
the second logic level, the fourth logic level, and the sixth logic level represent a high logic level value.

* * * * *